(12) United States Patent
Atas et al.

(10) Patent No.: US 9,058,333 B2
(45) Date of Patent: Jun. 16, 2015

(54) PUBLISHABLE METADATA FOR CONTENT MANAGEMENT AND COMPONENT TESTING

(75) Inventors: Yusuf Atas, Redmond, WA (US); Miguel A. Gonzalez, Redmond, WA (US); Kevin Lane Brown, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 548 days.

(21) Appl. No.: 13/039,164

(22) Filed: Mar. 2, 2011

(65) Prior Publication Data

US 2012/0226818 A1 Sep. 6, 2012

(51) Int. Cl.
*G06F 17/30* (2006.01)

(52) U.S. Cl.
CPC ...... *G06F 17/30079* (2013.01); *G06F 17/3089* (2013.01); *G06F 17/30106* (2013.01)

(58) Field of Classification Search
None
See application file for complete search history.

(56) References Cited

U.S. PATENT DOCUMENTS

| | | | |
|---|---|---|---|
| 6,430,177 B1* | 8/2002 | Luzeski et al. | 370/356 |
| 7,366,787 B2 | 4/2008 | Salas et al. | |
| 7,454,755 B2* | 11/2008 | Jacobs et al. | 718/105 |
| 2007/0299853 A1* | 12/2007 | Knotz et al. | 707/10 |
| 2008/0126364 A1* | 5/2008 | Khosravy et al. | 707/100 |
| 2010/0114939 A1* | 5/2010 | Schulman et al. | 707/769 |
| 2010/0146481 A1 | 6/2010 | Binder et al. | |
| 2012/0072608 A1* | 3/2012 | Peters et al. | 709/231 |
| 2012/0116876 A1* | 5/2012 | Graham, Jr. | 705/14.53 |

OTHER PUBLICATIONS

"Team-Based Development in SharePoint 2010", Retrieved at <<http://msdn.microsoft.com/en-us/library/gg512102.aspx>>, Dec. 2010, pp. 11.
Dumitras, et al., "Testing Run-time Evolving Systems", Retrieved at <<http://drops.dagstuhl.de/volltexte/2009/2106/pdf/09201.SWM.ExtAbstract.2106.pdf>>, 2009, pp. 7.
Von, et al., "Dynamic Upgrade of Distributed Software Components", Retrieved at <<http://deposit.ddb.de/cgi-bin/dokserv?idn=970318014&dok_var=d1&dok_ext=pdf&filename=970318014.pdf>>,Jan. 26, 2004, pp. 191.

(Continued)

*Primary Examiner* — Huy D Vu
*Assistant Examiner* — Bao G Nguyen
(74) *Attorney, Agent, or Firm* — Brian Haslam; Mike Allen; Micky Minhas

(57) ABSTRACT

Techniques related to publishable metadata for content management are described that enable selective invocation of new components in a web content management system. Metadata that is published in connection with corresponding content can be configured to include tags or other identifiers that cause a content management system to selectively direct content processing between existing and new components. Switches implemented by the content management system can operate to examine the metadata to determine which processing components are selected for particular content and direct the content to corresponding components. Switches can also be placed in websites to direct page requests from clients to existing or new rendering controls based upon publishable metadata that is associated with a requested page. Thus, the metadata and switches can be employed to perform testing of and load balancing between new and existing components in a live environment.

20 Claims, 5 Drawing Sheets

(56) References Cited

OTHER PUBLICATIONS

Warren, et al., "An Automated Formal Approach to Managing Dynamic Reconfiguration", Retrieved at <<http://ieeexplore.ieee.org/stamp/stamp.jsp?tp=&arnumber=4019560&userType=inst>>, 2006, pp. 10.

"Dynamic Reconfiguration of Component-based Real-time Software", Retrieved at <<http://www.slidefinder.net/d/dynamic_reconfiguration_component_based_real/9557492>>, Object-Oriented Real-Time Dependable Systems, 2005. Words 2005. 10th IEEE International Workshop on Feb. 2-4, 2005, pp. 2.

* cited by examiner

US 9,058,333 B2

PUBLISHABLE METADATA FOR CONTENT MANAGEMENT AND COMPONENT TESTING

BACKGROUND

One challenge related to online web services is being able to test new components in a live environment. Typically, if a new component is not fully ready for user consumption at the time a product is deployed, the component is withheld and not deployed to the live environment at all. Without testing a new component in a live environment, however, it can be difficult to troubleshoot and determine what is actually missing or wrong with that component. Even if extensive testing is performed offline by a product development team, it can be difficult to simulate real life usage and identify potential issues accurately in the offline setting.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques related to publishable metadata for content management are described that enable selective invocation of new components in a web content management system. Metadata that is published in connection with corresponding content can be configured to include tags or other identifiers that cause a content management system to selectively direct content processing between existing and new components. Switches implemented by the content management system can operate to examine the metadata to determine which processing components are selected for particular content and direct the content to corresponding components. Switches can also be placed in websites to direct page requests from clients to existing or new rendering controls based upon publishable metadata that is associated with a requested page. The publishable metadata for particular content can be dynamically changed and republished. By so doing, the amount of traffic that is directed between existing and new components can be altered at any time after the system is deployed. Thus, the metadata and switches can be employed to perform testing of and load balancing between new and existing components in a live environment.

BRIEF DESCRIPTION OF THE DRAWINGS

The same numbers are used throughout the drawings to reference like features.

DETAILED DESCRIPTION

Overview

Techniques related to publishable metadata for content management are described that enable selective invocation of new components in a web content management system. Metadata that is published in connection with corresponding content can be configured to include tags or other identifiers that cause a content management system to selectively direct content processing between existing and new components. Switches implemented by the content management system can operate to examine the metadata to determine which processing components are selected for particular content and direct the content to corresponding components. Switches can also be placed in websites to direct page requests from clients to existing or new rendering controls based upon publishable metadata that is associated with a requested page. Thus, the metadata and switches can be employed to perform testing of and load balancing between new and existing components in a live environment.

In the discussion that follows, a section titled "Operating Environment" is provided and describes one environment in which one or more embodiments can be employed. Following this, a section titled "Content Management System" describes an example system that can employ publishable metadata for content management in accordance with one or more embodiments. Next, a section titled "Example Methods" describes example methods related to publishable metadata for content management in accordance with one or more embodiments. Last, a section titled "Example System" describes example computing systems and devices that can be utilized to implement one or more embodiments.

Operating Environment

Figure 1:
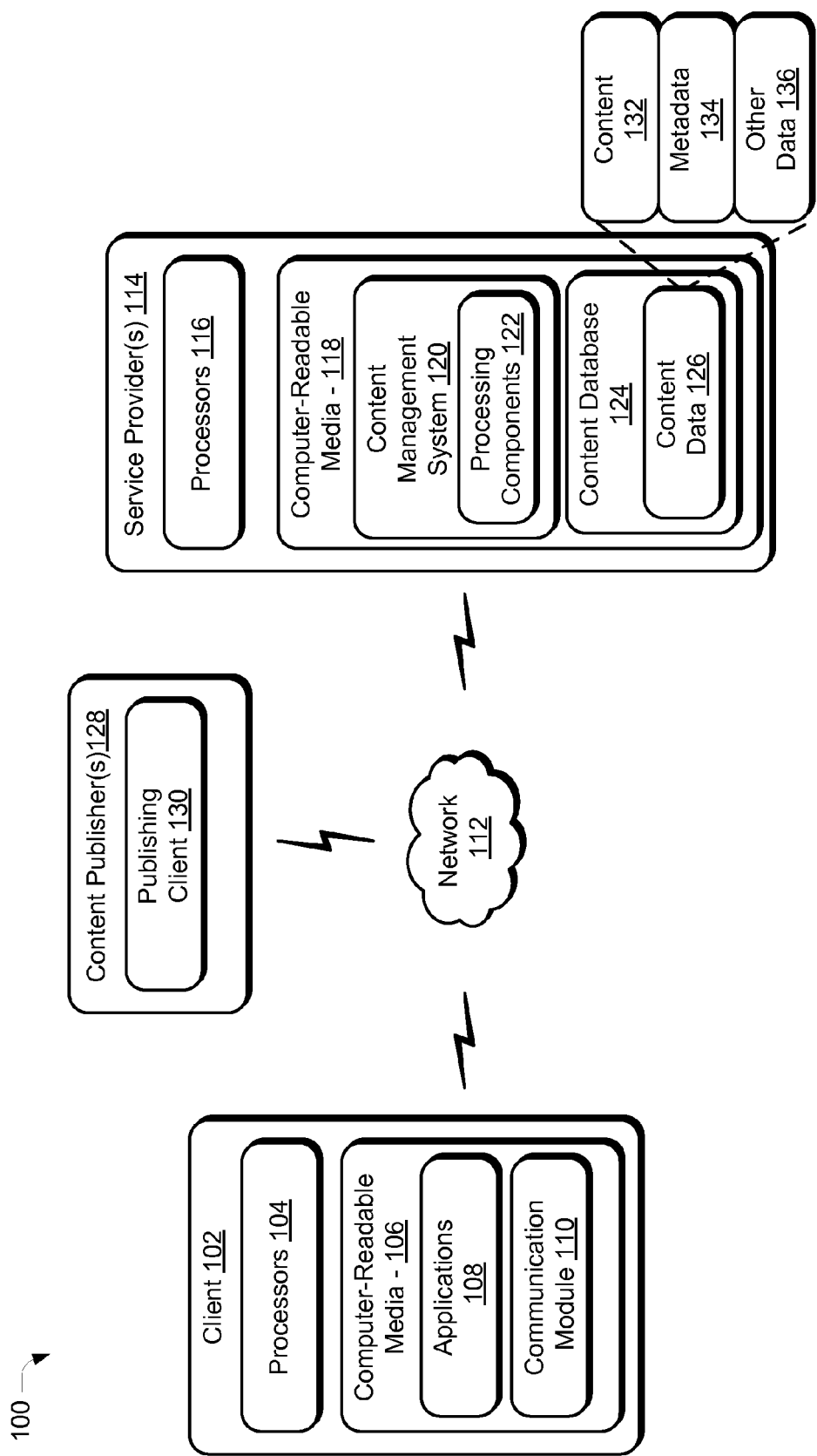
FIG. 1 illustrates an operating environment in which various principles described herein can be employed in accordance with one or more embodiments.

FIG. 1 illustrates an operating environment in accordance with one or more embodiments, generally at 100. Environment 100 includes a client 102 having one or more processors 104, one or more computer-readable media 106 and one or more applications 108 that reside on the computer-readable media and which are executable by the processor(s). The client 102 can be embodied as any suitable computing system and/or device such as, by way of example and not limitation, a desktop computer, a portable computer, as tablet computer, a handheld computer such as a personal digital assistant (PDA), a cell phone, a set-top box, and the like. One example of a computing system that can represent various systems and/or devices including the client 102 is shown and described below in FIG. 5.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 5.

In addition, client 102 includes a software application in the form of a communication module 110. The communication module 110 represents functionality of the client 102 operable to communicate with and interact with various other entities (e.g., other clients, providers, servers, web sites). For example, the communication module 110 may be configured as a web browser. Interactions with other entities can include sending and receiving electronic messages in various forms (e.g., e-mail, instant messages, text messages, and so forth) between the entities, obtaining resources (e.g., content and services) from the other entities, accessing and/or downloading various applications 108 from an online application catalog or store, and so forth.

The client 102 can be communicatively coupled over a network 112, such as the Internet, with one or more service providers 114 from and to which resources (e.g., content and services) can be received and sent. Example service providers 114 of FIG. 1 are each depicted as having one or more processors 116 and one or more computer-readable media 118. A service provider 114 can be implemented by way of one or more server devices. Accordingly, various example components represented and described for a service provider 114 can be included on a single server device and/or can be divided between multiple different server devices.

Service provider 114 is depicted as including a content management system 120. The content management system 120 represents functionality operable by the service provider 114 to manage various resources that may be made available over the network 112. For example, various resources can be provided by way of web pages, HTML pages, application UIs, or other user interfaces that are communicated over the network 112 for output by the client 102. The content management system 120 can manage access to the resources, performance of the resources, and configuration of user interfaces or data to provide the resources, and so on.

The content management system 120 can also be implemented to facilitate publishing of content by third-parties. The content management system 120 can be can be implemented to provide various interfaces and tools to facilitate website authoring, content publishing, dynamic updates to published content, and so forth. Through the content management system 120, third-parties publishers can publish not only content but also metadata that is associated with content. The content management system 120 enables non-technical users to develop, maintain, and modify website content and pages without requiring the users to have extensive knowledge of programming or markup languages.

For instance, in at least some embodiments, users can define web content through the content management system 120 using a declarative language that is relatively easy for non-technical users to understand and use. The content management system 120 can then operate to process such content in various ways to transform the content into pages suitable for delivery to clients. To do so, the content management system 120 as illustrated can include various processing components 122 that operate to process published content into a deliverable form for delivery to clients. The processing components 122 can include different pipelines having existing and/or new components, further description of which can be found in relation to the following figures.

Generally, resources made accessible by a service provider 114 can include one or more services and/or content. A service provider 114 can provide one or more web servers and/or sites, which a client 102 can navigate to in order to access the resources. The resources can include any suitable combination of services and/or content typically made available over a network by one or more providers. Some examples of services include, but are not limited to, a search service, an email service to send and receive email, an instant messaging service to provide instant messages between clients 102, and a social networking service to facilitate connections and interactions between groups of users who share common interests and activities. Additional examples of services include a shopping service, a weblog service, productivity service, an authentication service, a news service, and an advertisement service to name a few. Content may include various combinations of text, video, ads, audio, multi-media streams, animations, images, web pages, web applications, device applications, content for display by a browser or other device application, pages, URLS, and the like.

In addition, the service provider 114 can include or otherwise make use of one or more content databases 124 configured to store a variety of different content data 126 related to content items that are published, managed, and delivered to clients 102 via the content management system. A variety of content data 126 can be collected from different content publishers 128 over the network 112. The content publishers 128 represent developers, device manufacturers, and other third parties who may develop web sites and distribute published content to clients using the tools provided by the content management system 120. To do so, the content publishers 128 can include or otherwise make use of a publishing client 130 to interface with the content management system 120 over the network. Using the publishing client 130, content publishers 128 can access web-based tools and pages to develop content, submit content for publishing, manage published sites and pages, and so forth.

As depicted in FIG. 1, content data 126 includes at least actual content 132 and metadata 134 associated with content. Content 132 represents various pages, images, video, animations, effects, and other types of content described herein that can be included in a website and/or used to build the website. Metadata 134 represents various secondary data associated with content that can describe characteristics and properties of the content. In at least some embodiments, metadata 134 can include a field, flag, identifier, or other suitable metadata tag that is configured to indicate how the content management system 120 is to process the content. Thus, metadata 134 can be used to selectively direct content processing through different processing components 122, examples of which are described in relation to the following figures. A variety of other data 136 can also be provided examples of which include page templates, stylesheets, rendering scripts, and so forth.

Having described an example operating environment, consider now a discussion of an example content management system in accordance with one or more embodiments.

Content Management System

The following section provides a discussion of a content management system in accordance with one or more embodiments. The content management system can be implemented to enable third-party content publishers to selectively direct and publish content through different processing components. This approach can be employed to perform testing of new components in a live environment for a selected subset of content. This can occur simultaneously with using existing components for at least some of the content. In at least some embodiments, content can be directed using strategically placed switches implemented by the content management system. The switches operate to examine metadata associated with content and detect tags or other identifiers contained in the metadata that are configured to control whether to exercise existing or new components.

Figure 2:
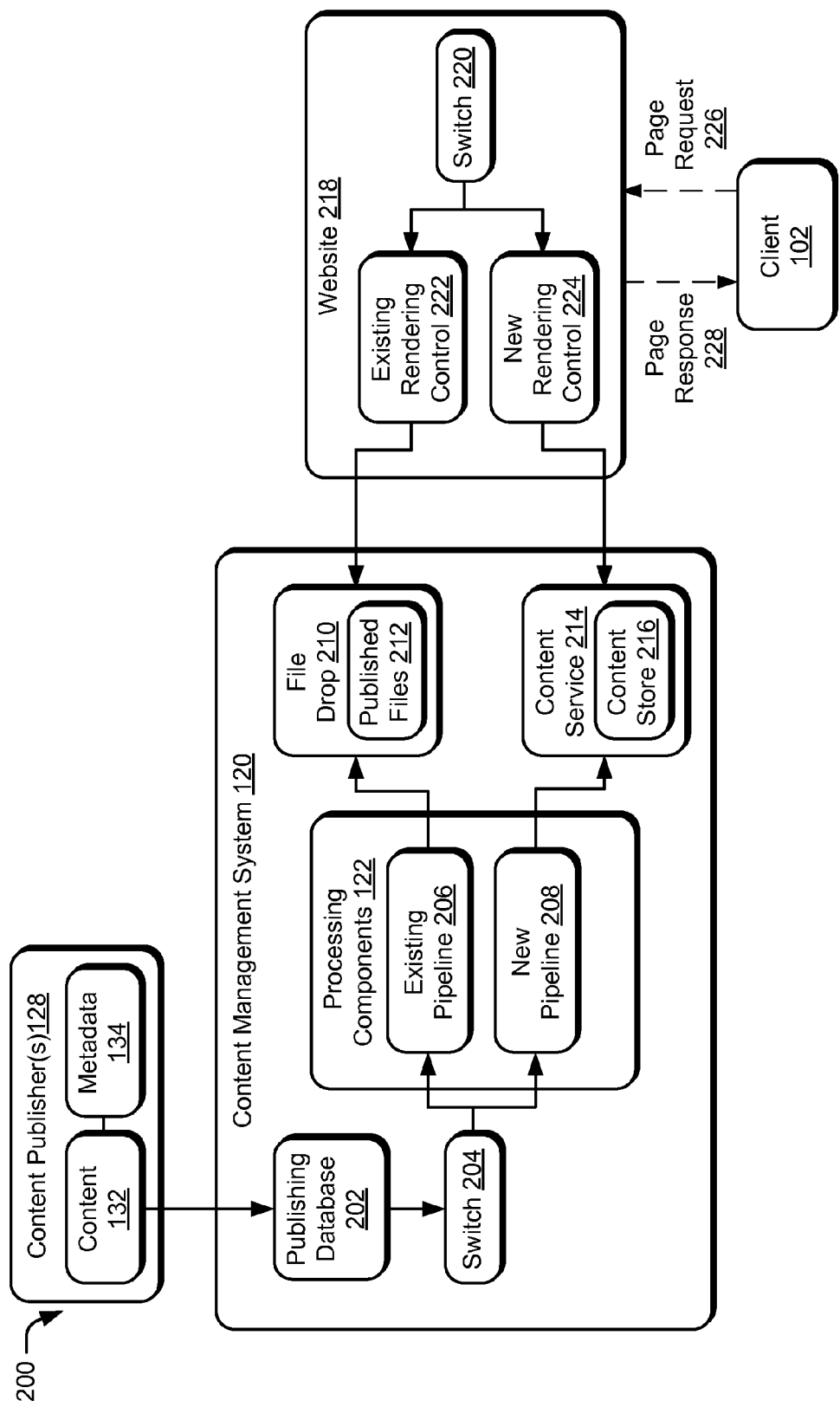
FIG. 2 is an example content management system in accordance with one or more embodiments.

In particular, FIG. 2 depicts, generally at 200, details regarding an example content management system 120 in accordance with one or more embodiments. In the depicted example, a publishing database 202 can obtain content 132 that has associated metadata 134 from content publishers 128.

Content can then be processed via a switch 204 designed to selectively direct content to appropriate components. The switch 204 represents functionality implemented by the content management system 120 to examine metadata 134 associated with content and determine components to invoke to process or deliver the content based on the metadata.

For instance, content publishers 128 can configure metadata 134 for particular content in any suitable way to indicate which processing components 122 to use for processing the content. For example, content publishers 128 can set metadata tags, fields, or other suitable identifiers associated with content to indicate whether to process components via an existing pipeline 206 or a new pipeline 208. As illustrated, the existing pipeline 206 and the new pipeline 208 (as well as other pipelines) can be deployed side-by-side in a live environment. The existing pipeline 206 represents a processing pipeline of existing components that have been thoroughly tested and are considered complete. In other words, these components are fully developed and deployed. The new pipeline 208 represents a processing pipeline having new components that are under development, under testing, and/or are otherwise not ready for full scale deployment. Such components may not be considered ready to handle a high volume of users or may not have been tested sufficiently to ensure that the components are reliable and are likely to provide users with a solid experience.

In operation, the switch 204 examines the metadata associated with content and determines based on metadata where to direct the content. The switch 204 can then direct the content through the existing pipeline 206 and the new pipeline 208 as appropriate. Pipelines can be configured in various ways to process content from publishers into content suitable for delivery to clients. Moreover, although two example pipelines are depicted, techniques described herein can more generally be applied to any number of processing pipelines.

In the example of FIG. 2, the existing pipeline 206 corresponds to a processing path by which content can be formatted for publishing via a file drop 210. In particular, the existing pipeline 206 processes the content to produce published files 212 that are suitable for delivery to clients. In this approach, existing pipeline 206 can operate to translate content from content publishers from an authoring format to a publishing format to create the published files 212. In other words, the content can be compiled to produce files that are in a selected publishing format. Rendering controls invoked by a website in connection with page requests can then operate upon the published files to produce rendered content that is understandable by a consuming client. The published files 212 that are stored at the file drop 210 can be accessed by clients to obtain corresponding content. For instance, files can be placed into designated locations in directories in the file drop 210 to enable clients that know the particular file locations (e.g., URLs, links, etc.) to retrieve the corresponding files. The existing pipeline 206 can represent any suitable combination of existing processing components and in general relates to established processing techniques.

On the other hand, the new pipeline 208 corresponds to a processing path by which content can be formatted for publishing via a content service 214. The content service can be configured to store the content processed by the new pipeline 208 in a content store 216. The content store 216 can be configured as a server query language (SQL) database or other suitable database to store various content. Content service 214 can therefore enable various database tools to manage, look-up, and disseminate the content. The files can also be retrieved using suitable queries, URLS, links, or other identifiers. The new pipeline 208 can represent any suitable combination of processing components with at least some of the components still being under development and/or put through various testing.

FIG. 2 also depicts an example website 218 that includes another switch 220. Switches can be implemented for websites to direct page rendering to appropriate components much in the same way as the switches used to direct content processing. For example, the switch 220 can be configured to selectively direct processing to an existing rendering control 222 or a new rendering control 224. This can occur in connection with a page request 226 that is made by a client.

For instance, when the page request 226 is obtained, the switch 220 can check metadata associated with a requested page and determine based on the metadata where to direct rendering for the requested page. Then, a page response 228 can be provided back the client having the requested page that is rendered using appropriate components. Thus, if metadata of the requested page designates existing components, the switch 220 directs the page request 226 through the existing rendering control 222. In this case, the page response 228 and content can be obtained via the file drop 210. On the other hand, if metadata of the requested page designates new components, the switch 220 directs the page request 226 through the new rendering control 224. In this case, the page response 228 and content can be obtained via the content service 214.

Having described an example content management system, consider now example procedures for employing publishable metadata for content management in accordance with one or more embodiments.

Example Methods

The following section provides a discussion of flow diagrams that describe steps of example methods related to publishable metadata for content management in accordance with one or more embodiments. The methods can be implemented in connection with any suitable hardware, software, firmware, or combination thereof In at least some embodiments, the methods can be implemented by way of a suitability configured computing device, such as the example service provider 114 of FIG. 1 that includes or otherwise makes use of a content management system 120.

Figure 3:
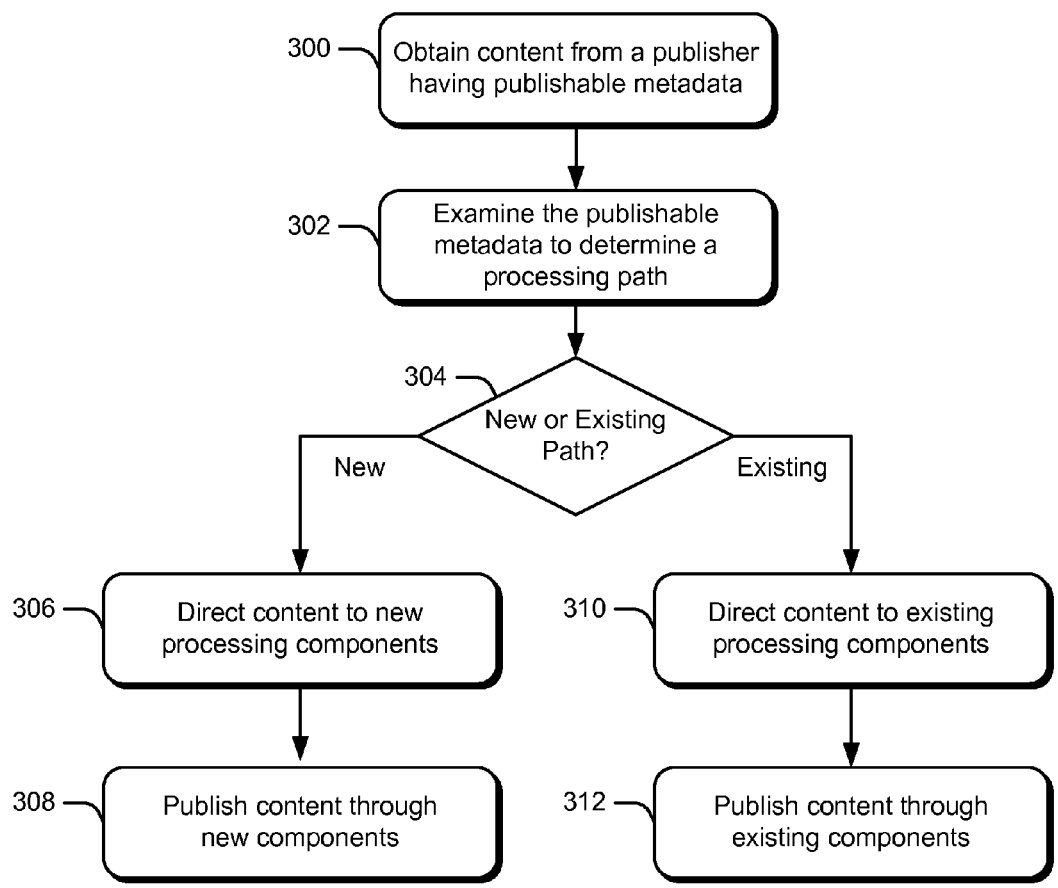
FIG. 3 is a flow diagram that describes steps of a method in accordance with one or more embodiments.

FIG. 3 is a flow diagram that describes steps of a method in accordance with one or more embodiments. Step 300 obtains content from a publisher having publishable metadata. For example, a content management system 120 can obtain content for processing from a content publisher 128 via a publishing client 130 of the content publisher 128. The content publisher 128 can include metadata 134 with the content to describe which pipeline and/or components of the content management system 120 are to be used to process the content. The metadata is considered publishable because the content publishers 128 can set, control, modify, and update the metadata at any time as they see fit to direct processing of their content and pages to different components of the content management system 120. Thus, publishable metadata can be employed to designate a subset of content to send through new components. Content publishers 128 can decide for themselves which content to send through different components. Moreover, since the metadata is publishable, content publishers 128 can change the subset of content that is selected at anytime after the content is published. This approach provides the flexibility to implement and test new components in a live environment and in a controlled manner.

As noted, setting metadata can include configuring metadata tags associated with the content. Metadata tags can be associated with content in various ways. This includes associating tags for an entire website or product having many pages, a sub-group or portion of a website, and/or for individual pages or content items. Tags can also correspond to individual processing components so that the individual components can be selectively invoked. Thus, one new component can be applied to an entire website, while a different new component is designated for use with selected pages of the website for which metadata tags are set to select the different new component.

Step 302 examines the publishable metadata to determine a processing path. For instance a switch can detect metadata tags and/or other data within metadata. The switch can parse the metadata to discover such tags and understand which processing components are designated by the metadata tags for corresponding content. Metadata conveying selected processing components can be configured in any suitable way. For example, the metadata can be configured to pass numeric or textual values that correspond to different processing components and/or pipelines. Thus, a value of "0" or "exist" may indicate existing components and a value of "1" or "new" may indicate new components. Naturally, additional values can be used to support implementations having more than two different processing paths.

Based on this examination, step 304 determines whether to perform publishing using a new or existing processing path. This can involve selecting between entire processing pipelines and/or individual components that perform designated tasks. Moreover, selection of processing components 122 can occur between two or more different components and/or corresponding processing pipelines. Thus, it is possible to select between three, four, or even more different pipelines.

When new components are designated, step 306 directs content to the new processing components and step 308 publishes the content through the new processing components. For instance, in the example of FIG. 2, processing can be directed by the switch 204 through the new pipeline 208 when metadata 134 includes a metadata tag or other identifier configured to cause processing through new processing components. Publishing can then occur via the example content service 214.

When existing components are designated, step 310 directs content to the existing processing components and step 312 publishes the content through the existing processing components. For instance, in the example of FIG. 2, processing can be directed by the switch 204 through the existing pipeline 206 when metadata 134 includes a metadata tag or other identifier configured to cause processing through existing processing components. Publishing can then occur via the example file drop 210.

By selectively directing content in this manner, various load balancing between new and existing components can be achieved. For example, pages having relatively low traffic can initially be designated as candidates for being handled through new components. The amount or percentage of traffic through new components can be incrementally increased depending upon whether or not any problems are encountered. Thus, the described approach can be used to gradually scale up implementation of new components and identify any scalability problems along the way.

Also, since the existing components remain in place, the existing components can be relied upon as a fall back in case any difficulties are encountered. It is a relatively simple matter to change the metadata associated with content to redirect the content load between various components as appropriate to a given situation. Moreover, new components can be deployed and tested in a controlled manner in a live environment. Thus, content publishers 128 and service providers 114 are able to obtain "real life" usage data while minimizing the impact upon users of new component testing.

Figure 4:
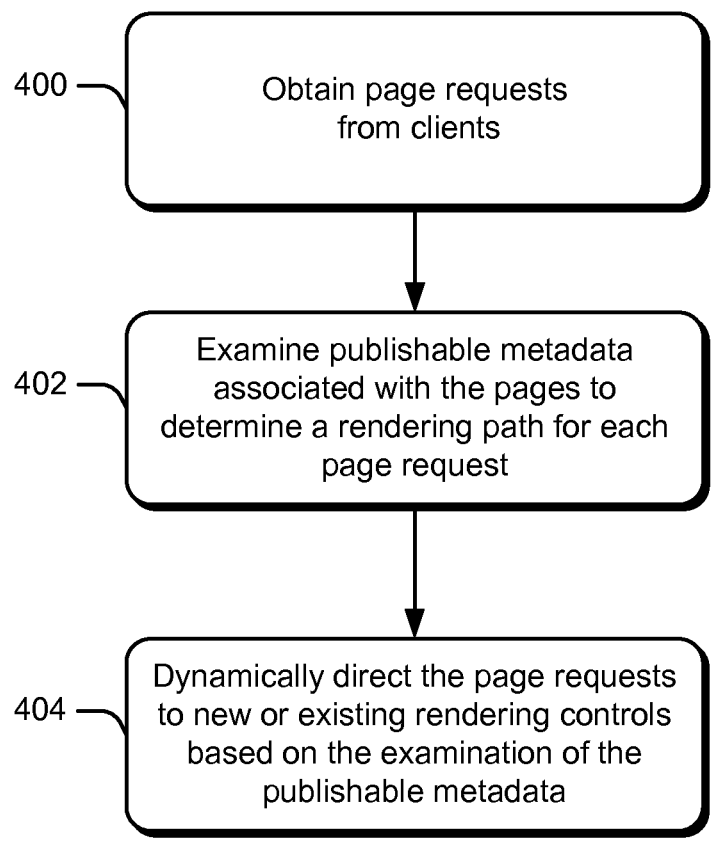
FIG. 4 is a flow diagram that describes steps of a method in accordance with one or more embodiments.

FIG. 4 is a flow diagram that describes steps of another method in accordance with one or more embodiments. Step 400 obtains page requests from clients. For instance, a client 102 can execute a communication module 110 in the form of a browser to access resources over the network 112 from a service provider 114. In so doing, the browser can form a page request 226 that is delivered to a website 218. The website 218 can represent a site managed via the service provider 114 or a third-party site. In either case, the page request 226 can be redirected to the content management system 120 for handling via selected components.

Step 402 examines publishable metadata associated with the pages to determine a rendering path for each page request.

For example, a switch 220 implemented at the website can operate to examine metadata 134 associated with a requested page. The metadata can be configured with a tag or other suitable identifier that indicates how to render the page. The switch operates to detect the tag and handle the content in accordance with the tag.

In particular, step 404 dynamically directs the page requests to new or existing rendering controls based on the examination of the publishable metadata. For instance, the examination of metadata in step 402 can determine whether new or existing rendering components are selected for the requested page. Thus, the page request 226 can be selectively directed between an existing rendering control 222 and a new rendering control 224 as appropriate.

When the existing rendering control 222 is invoked, rendering can occur via existing components, such as by obtaining published files 212 from the example file drop 210 of FIG. 2. On the other hand, when the new rendering control 224 is invoked, rendering can occur via new components, such as by obtaining content maintained in the content store 216 of the example content service 214 of FIG. 2.

In this manner, page loads can be directed between existing and new components. Content publishers 128 can change and republish metadata of the pages through the content management system 120 to adjust the load between the existing and new components. This approach enables content publishers 128 to manage the load and/or incrementally launch new components. The new components can also be tested in a live environment and performance characteristics of the newly deployed components can be precisely tested and monitored. By sending a select subset of content through the newly deployed components, the impact of live testing on clients 102 can be minimized.

Having considered various example methods related to publishable metadata for content management, consider now an example system that can be employed to implement various embodiments.

Example System

Figure 5:
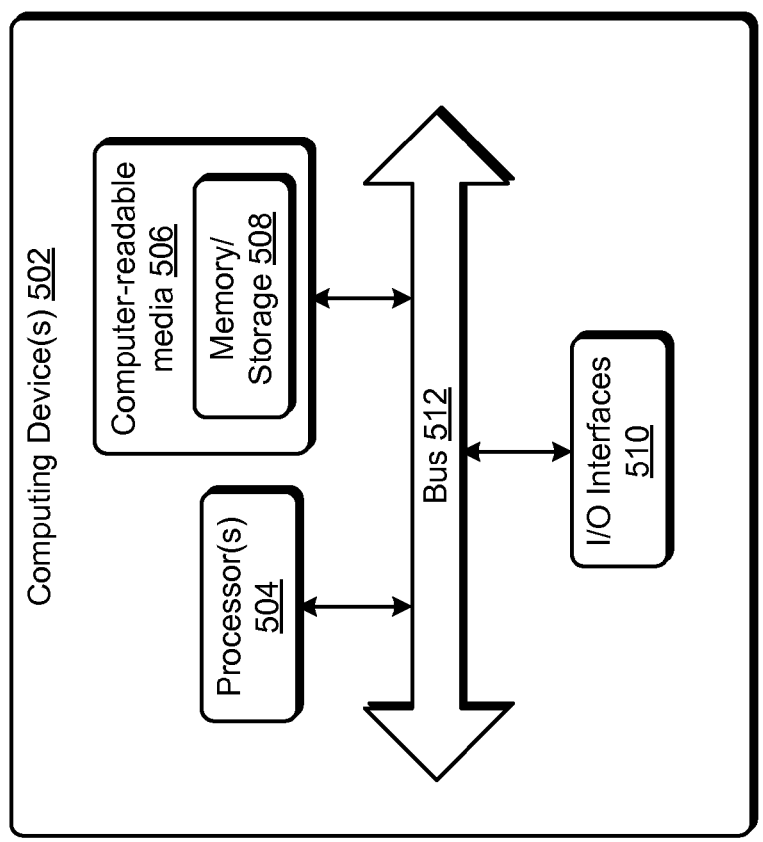
FIG. 5 illustrates an example computing system that can be used to implement one or more embodiments.

FIG. 5 illustrates an example system generally at 500 that includes an example computing device 502 that is representative of one or more such computing systems and/or devices that may implement the various embodiments described above. The computing device 502 may be, for example, a server of a service provider 114, a device associated with the client 102 (e.g., a client device), an on-chip system, and/or any other suitable computing device or computing system.

The example computing device 502 includes one or more processors 504 or processing units, one or more computer-readable media 506 which may include one or more memory and/or storage components 508, one or more input/output (I/O) interfaces 510 for input/output (I/O) devices, and a bus 512 that allows the various components and devices to communicate one to another. Computer-readable media 506 and/or one or more I/O devices may be included as part of, or alternatively may be coupled to, the computing device 502. The bus 512 represents one or more of several types of bus structures, including a memory bus or memory controller, a peripheral bus, an accelerated graphics port, and a processor or local bus using any of a variety of bus architectures. The bus 512 may include wired and/or wireless buses.

The one or more processors 504 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 508 represents memory/storage capacity associated with one or more computer-readable media. The memory/storage component 508 may include volatile media (such as random access memory (RAM)) and/or nonvolatile media (such as read only memory (ROM), Flash memory, optical disks, magnetic disks, and so forth). The memory/storage component 508 may include fixed media (e.g., RAM, ROM, a fixed hard drive, etc.) as well as removable media (e.g., a Flash memory drive, a removable hard drive, an optical disk, and so forth).

Input/output interface(s) 510 allow a user to enter commands and information to computing device 502, and also allow information to be presented to the user and/or other components or devices using various input/output devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. Computer-readable storage media also includes hardware elements having instructions, modules, and/or fixed device logic implemented in a hardware form that may be employed in some embodiments to implement aspects of the described techniques.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed logic) of an integrated circuit or chip, or other storage device, tangible media, or article of manufacture suitable to store the desired information and which may be accessed by a computer.

"Communication media" may refer to a signal bearing medium that is configured to transmit instructions to the hardware of the computing device, such as via the network 112. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the content management system 120, applications 108, communication module 110, publishing client 130 and other program modules, may be implemented as one or more instructions and/or logic embodied on some form of computer-readable media.

Accordingly, particular modules, functionality, components, and techniques described herein may be implemented in software, hardware, firmware and/or combinations thereof. The computing device 502 may be configured to implement particular instructions and/or functions corresponding to the software and/or hardware modules implemented on computer-readable media. The instructions and/or functions may be executable/operable by one or more articles of manufacture (for example, one or more computing devices 502 and/or processors 504) to implement techniques related to publishable metadata for content management, as well as other techniques. Such techniques include, but are not limited to, the example procedures described herein. Thus, computer-readable media may be configured to store or otherwise provide instructions that, when executed by one or more devices described herein, cause various techniques related to publishable metadata for content management.

CONCLUSION

Techniques related to publishable metadata for content management have been described that enable selective invocation of new components in a web content management system. Metadata that is published in connection with corresponding content can be configured to include tags or other identifiers that cause a content management system to selectively direct content processing between existing and new components. Switches implemented by the content management system can operate to examine the metadata to determine which processing components are selected for particular content and direct the content to corresponding components. Switches can also be placed in websites to direct page requests from clients to existing or new rendering controls based upon publishable metadata that is associated with a requested page. Thus, the metadata and switches can be employed to perform testing of and load balancing between new and existing components in a live environment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
  obtaining content from a content publisher having publishable metadata;
  examining the publishable metadata to determine a processing path designated for the content by the publishable metadata; and
  determining, based on said examining, that the processing path designated for the content comprises new or existing processing components, the new processing components comprising one or more processing components that are still under development;

selectively directing the content to new or existing processing components in accordance with the processing path designated by the publishable metadata;

publishing the content through the new or existing processing components; and dynamically directing a page request from a client for a page including the content to new or existing rendering controls based upon an examination of publishable metadata associated with the page to determine a rendering path designated for the content by the publishable metadata.

2. The computer-implemented method of claim 1, wherein the processing components comprise portions of a content management system provided by a service provider.

3. The computer-implemented method of claim 2, wherein the service provider is configured to provide a plurality of resources to clients over a network.

4. The computer-implemented method of claim 1, wherein the publishable metadata is updatable by the content publisher to change the processing path designated for the content.

5. The computer-implemented method of claim 1, wherein examining the publishable metadata comprises detecting a metadata tag configured to cause a switch to direct the content to the designated processing path.

6. The computer-implemented method of claim 1, wherein the obtaining, examining, and selectively directing are performed via a switch deployed to a content management system designed to facilitate publishing of web content by content publishers.

7. The computer-implemented method of claim 1, wherein the processing components are configured perform processing to transform the content obtained from the content publisher into content in a form for delivery to clients.

8. A system comprising:
one or more processors; and
one or more computer-readable storage media storing instructions that, are executable by the one or more processors to implement a content management system having various processing components to facilitate publishing of content from content publishers, the content management system configured to:
obtain content from a content publisher having publishable metadata;
implement a switch configured to:
examine the publishable metadata to determine a processing pipeline designated for the content by the publishable metadata;
determine, based on the examination, that the processing pipeline designated for the content comprises either a new or existing processing pipeline, the new processing pipeline comprising processing components with one or more of the processing components still under development; and
selectively direct the content between an existing processing pipeline and a new processing pipeline in accordance with the processing pipeline designated by the publishable metadata;
publish the content through the new or existing processing pipeline; and
dynamically direct a page request from a client for a page including the content to new or existing rendering controls based upon an examination of publishable metadata associated with the page to determine a rendering path designated for the content by the publishable metadata.

9. The system of claim 8, wherein the publishable metadata is updatable by the content publisher to change the processing pipeline designated for the content.

10. The system of claim 8, wherein the publishable metadata is configured to include a metadata tag that defines the processing pipeline designated for the content.

11. The system of claim 8, wherein the existing processing pipeline publishes content to a file drop and the new processing pipeline publishes content to a content service.

12. A computer implemented method comprising:
obtaining page requests from clients for pages having content from content publishers;
examining publishable metadata associated with the pages to determine a rendering path for each page request; and
dynamically directing the page requests between a new rendering control and an existing rendering control based on the examination of the publishable metadata, wherein the metadata is configured to enable selection of new or existing rendering components through new or existing rendering controls, wherein the new rendering control obtains page responses from a new processing pipeline, the new processing pipeline comprising one or more processing components that are still under development, and wherein the existing rendering control obtains page responses from an existing processing pipeline, the existing processing pipeline comprising processing components that are fully developed and deployed.

13. The computer implemented method of claim 12, wherein the publishable metadata associated with the pages is updatable by the content publishers to manage a load balance between new and existing rendering components of a content management system.

14. The computer implemented method of claim 12, further comprising delivering page responses having the requested pages to the clients over a network, the requested pages rendered in accordance with the rendering path determined for each page request.

15. The computer-implemented method of claim 1, further comprising deploying the new processing pipeline and the existing processing pipeline in a side-by-side environment.

16. The computer-implemented method of claim 1, further comprising using the existing processing components as a fall back rendering option when difficulties are encountered with the new processing components.

17. The computer-implemented method of claim 1, further comprising obtaining usage data relating to the new processing components.

18. The system of claim 8, further comprising deploying the new processing pipeline and the existing processing pipeline in a side-by-side environment.

19. The system of claim 8, wherein the dynamically directing the page request further comprises obtaining the page response via a file drop responsive to directing the page through an existing rendering control, and obtaining the page response via a content service responsive to directing the page through the new rendering control.

20. The computer implemented method of claim 12, further comprising obtaining usage data relating to the new processing components.

* * * * *